Patented Nov. 24, 1925.

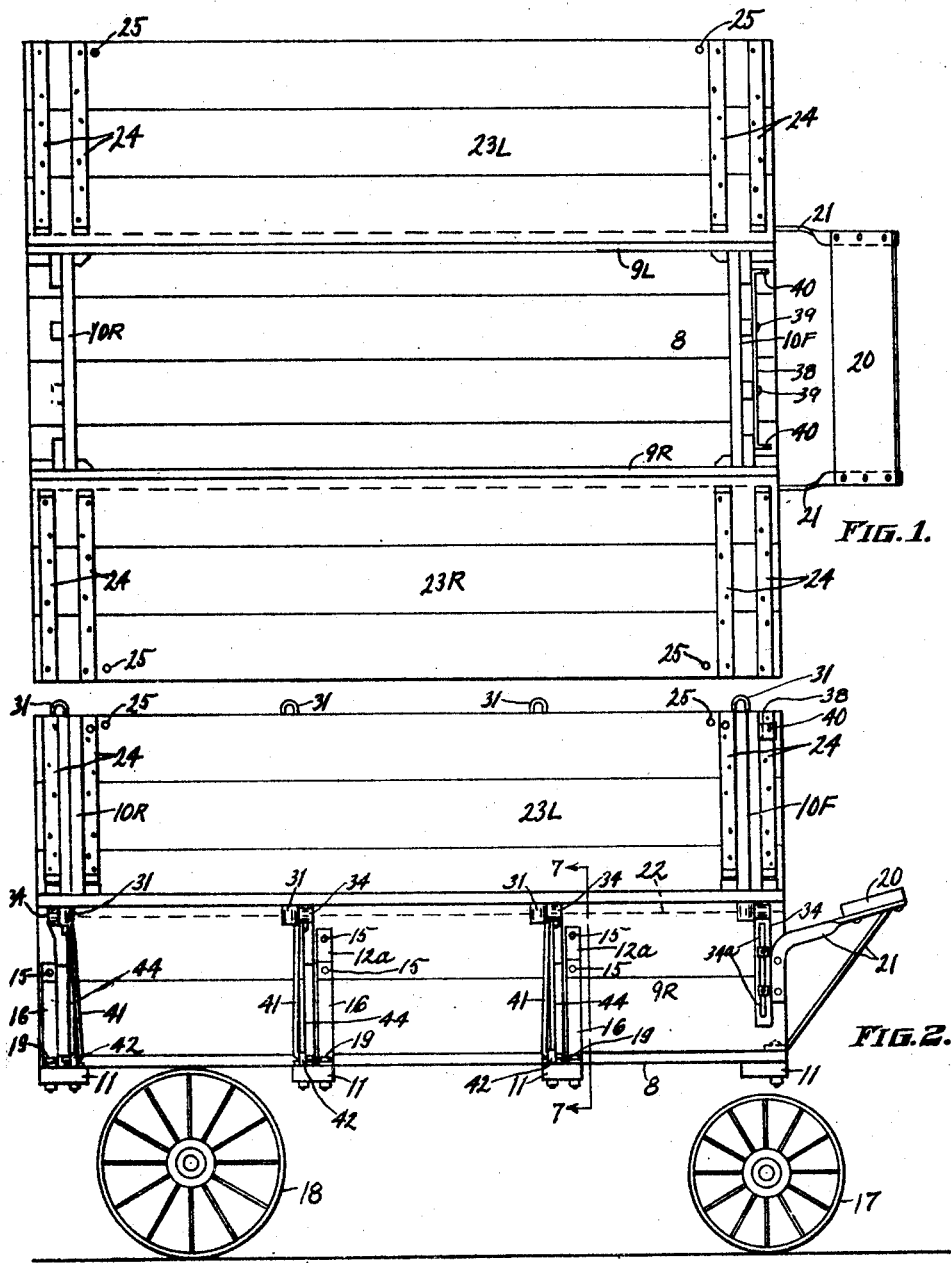

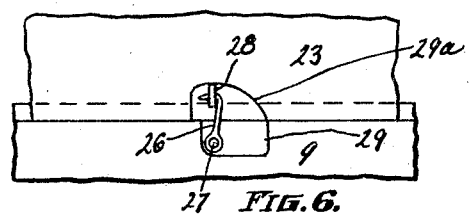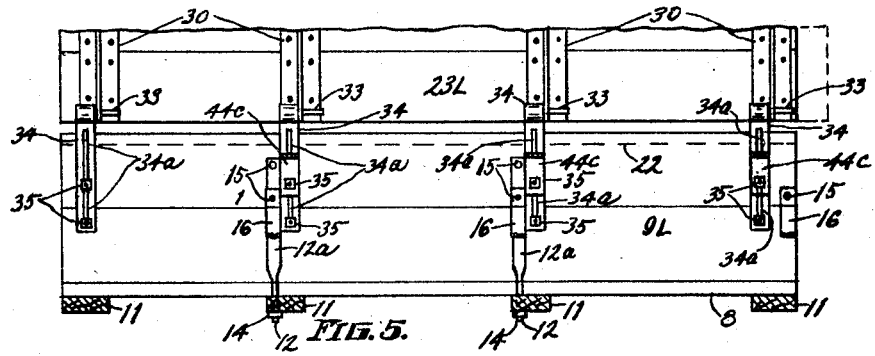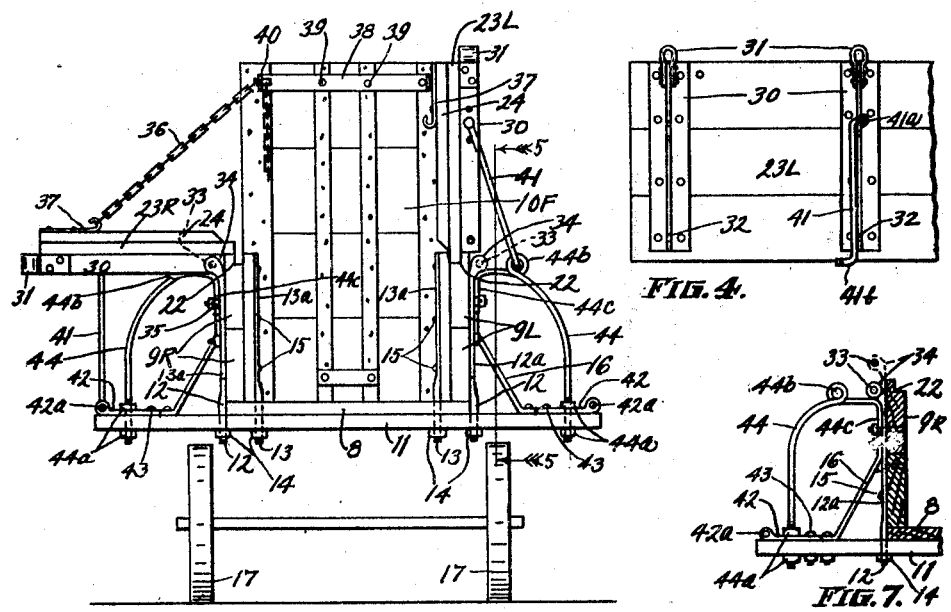

1,562,756

UNITED STATES PATENT OFFICE.

HENREY GOSSE, SR., OF WABASHA, MINNESOTA.

CONVERTIBLE VEHICLE BODY.

Application filed July 21, 1924. Serial No. 727,184.

*To all whom it may concern:*

Be it known that I, HENREY GOSSE, Sr., a citizen of the United States, residing at Wabasha, in the county of Wabasha and State of Minnesota, have invented certain new and useful Improvements in Convertible Vehicle Bodies, of which the following is a specification.

My invention relates to vehicle bodies in general and more particularly to a vehicle body most adaptable for farm use.

The object is to provide a simple and efficient vehicle body which is readily convertible for transporting farm products, livestock etc., the construction being such that its sphere of usefulness is very broad and eliminates the need of a farmer or person doing various kinds of hauling having several vehicle bodies each for its specific use.

In the accompanying drawings:

Fig. 1 is a top or plan view of a truck embodying my improved vehicle body and shown used as a hayrack.

Fig. 2 is a right side elevation of Fig. 1 with the left side extension wall in vertical position.

Fig. 3 is a front view of Fig. 2 with the driver's foot board omitted.

Fig. 4 is a vertical outside elevation of one end of a hinged side section used on my device.

Fig. 5 is a partly sectional side elevation as on line 5—5 in Fig. 3.

Fig. 6 is an enlarged inside elevation of the overlapped parts of the permanent and hinged side walls and showing means for locking said parts together.

Fig. 7 is a sectional view of one side wall about as on line 7—7 in Fig. 2.

Referring to the drawing by reference numerals, my vehicle body comprises an elongated quadrangular box with bottom 8, fixed right and left sides $9^R$ and $9^L$ respectively and front and rear walls $10^F$ and $10^R$ respectively, the latter being higher than the fixed side walls as shown. 11 are a number of transverse, longitudinally spaced bars secured to the under side of the floor or bottom 8 by outside bolts 12 and inside bolts 13. Said bars 11 project equidistant from both sides of the main vehicle body. The bolts 12—13 are passed upwardly through the bars 11 above which they are formed as flat bars $12^a$—$13^a$ respectively and secured to the walls by bolts 15 or like means, nuts 14 securely holding the bars 11 against the floor of the vehicle.

The vehicle body is mounted on any suitable type of truck bolster (not shown) supported by front ground wheels 17 and rear wheels 18.

16 are angular body wall braces each secured with one end as at 19 on the outer part of a bar 11 and its inner, upper end bolted to the side of the body preferably by one of the bolts 15 (see Figs. 2, 3, 5 and 7).

20 is a driver's foot board secured as with braces 21 on the front end of the wagon box. A driver's seat (not shown) may be mounted in any suitable relation to said foot board.

The side walls $9^R$ and $9^L$ have their upper edges rabbeted inwardly as at 22 to receive the lower edges of respective wall extensions $23^R$ and $23^L$ when the latter are in vertical position (see Fig. 3). 24 are spaced cross cleats on the extension walls, located to straddle the vertical edges of the front and rear end walls $10^F$ and $10^R$ and prevent longitudinal movement of the extension walls. The walls $23^R$ and $23^L$ may have horizontally registering apertures 25 one near each pair of the cleats 24 for insertion of a cross bar (not shown) as commonly used in wagon boxes to hold the side walls rigid. The walls $23^R$ and $23^L$ are of such thickness as to fit snugly into the rabbeted part 22 of the wagon box and forming a continuous, smooth inner wall surface.

To prevent separation of the walls any suitable interlocking means may be used but in Fig. 6 I have shown a common hook 26 pivoted at 27 in wall 9 and adapted to be swung into an eye 28 secured in the extension wall 23, all said parts being in contiguous recesses 29—$29^a$ so as not to obstruct the smooth inner wall surface.

The extension walls have each secured on its outer side a number of spaced cross members 30, preferably T-irons, the leg of each such T projecting outwardly. The outer ends of these T-irons may carry stake pockets 31 projecting from the outer edge of the wall members (see Figs. 2, 3 and 4). The opposite end of each T-iron leg has an aperture 32 adapted to receive and hold slidably a horizontal pin 33 secured in the upper end of a vertically arranged, flat bar 34 slidably held on the side wall $23^R$ or $23^L$ by bolts 35 engaging slots $34^a$ in each bar (see Fig. 5). Apertures 32 of members 30 are each engaged by one of said pins 33 when the extension walls are extended horizontally and outwardly from the top edge of the walls 9ᴿ and 9ᴸ and when the extensions are in this position the vehicle body serves as an excellent hay rack the use of which is enhanced by placing stakes (not shown) in the pockets 31 for carrying very large loads.

The end portions of the extension walls may each be held in horizontal position by a chain 36 one end of which engages a hook 37 on the wall member from where the chain is passed upwardly, diagonally to a flat-bar bracket 38 suitably secured as at 39 to the upper part of the end wall 10, said bracket having a notch 40 (see Figs. 1, 2 and 3) adapted to be engaged flatways by one of the links of the chain as in Fig. 3. Each side extension wall is however mainly held in horizontal position by a number of hook-bars 41 each of which has an upper headed end 41ᵃ engaging an aperture in the leg or flange of the cross member or cleat 30 and its lower end having a hook 41ᵇ adapted to engage in the eye 42ᵃ of an eye-bracket 42 secured at 43 on the outer end of each body supporting bar 11 (see Figs. 2, 3 and 4). Said eye-bracket may be an integral part of the bracing bracket 44 and brace 16 if so desired.

44 is a vertically arranged bracket, preferably made of round bar iron, one bracket for each body bar 11. The outer and lower end of each such bracket is preferably threaded and secured to bar 11 by nuts 44ᵃ (Figs. 3 and 7). The upper portion of each bracket is formed as an eye or small loop 44ᵇ located outwardly from the side of the main vehicle body and below its rabbeted edge. The lower hook part of each bar 41 (which engages eye 42ᵃ when the extension wall is horizontal) may be engaged in said eye 44ᵇ when the extension walls are in vertical position (see right side of Fig. 3). The bracket 44 is continued from eye 44ᵇ horizontally toward the vehicle body, thence bent downwardly, as 44ᶜ in Figs. 3 and 7, said downwardly bent part being flattened and having an aperture engaged by one of the bolts 35 (see also Fig. 5). When it is desired to convert the vehicle body from a hay rack to a deep box body it is apparent that all the hooks 41 must first be disengaged and also the chains 36. Then each extension wall is slid lengthwise to disengage it from the pins 33 of brackets 34, after which the wall is raised to vertical position and slipped down with its lower edge into the rabbet 22 and then secured in said vertical position as previously described.

When transporting live stock it is desirable to have the permanent and extension side walls spaced apart for air circulation, as shown in Fig. 5. To hold the said walls in vertical spaced relation the slotted side bars 34 are first loosened at 35 and then pushed up the desired height so that the pins 33 will engage the T-members of the extension walls and hold the latter elevated above the main body box, the bolts 35 of course being tightened again.

Further description relative to the use of my device other than above disclosed is superfluous. It might be added however that my convertible vehicle body is useful for an extremely wide sphere of uses. Without the side extensions it serves as an ordinary farm wagon and with the side extensions applied vertically or horizontally its loading capacity is greatly increased and with the use of stakes as described it is obvious that the capacity is still further greatly increased.

What I claim is:

1. In a vehicle body having transverse bottom bars projecting beyond its sides, the combination with unfoldable end walls, of side walls each of which comprises a lower permanently vertical section and an upper section hinged to the lower section so as to be foldable alternately into vertical and horizontal position, and means for holding said foldable sections in either of said positions; said holding means comprising at each side of the vehicle bracing brackets secured to the lower side section and to the bottom bars projecting from under the same; said brackets having each an eye, and the foldable side sections having above each of said brackets a transverse cleat with a hole in it; a brace rod having at each end an angularly bent portion, one of said portions having a head designed to retain it in the hole in the cleat, the other end serving as a hook adapted to engage alternately in the upper eye of the bracket when the top section is in vertical position and in the lower eye when said section is folded outward.

2. The structure specified in claim 1, in which the upper side sections are detachable from the lower sections by having hinge pintles fixed each in one of the hinge members and extractable from the other hinge member, and means for holding the pintles properly engaged as a hinge-pintle.

3. The structure specified in claim 1, in which each cleat has two holes one higher up than the other for the brace rod and the brace rod being easily movable to either hole, and said hinges connecting the foldable side sections having each one of its members provided with vertically slotted holes for the bolts securing the hinge member to the section, so as to permit spacing of the upper side member away from the lower member when so desired.

In testimony whereof I affix my signature.

HENREY GOSSE, Sr.